United States Patent
Nagatsuka et al.

(10) Patent No.: US 7,912,584 B2
(45) Date of Patent: Mar. 22, 2011

(54) POWER CONSUMPTION ESTIMATION APPARATUS

(75) Inventors: Yoshiharu Nagatsuka, Yamanashi (JP); Hiroshi Nakagawa, Yamanashi (JP); Engaku Ryou, Yamanashi (JP)

(73) Assignee: Fanuc Ltd, Yamanashi (JP)

( * ) Notice: Subject to any disclaimer, the term of this patent is extended or adjusted under 35 U.S.C. 154(b) by 0 days.

(21) Appl. No.: 12/762,687

(22) Filed: Apr. 19, 2010

(65) Prior Publication Data

US 2010/0305751 A1  Dec. 2, 2010

(30) Foreign Application Priority Data

May 27, 2009  (JP) ................................. 2009-127943

(51) Int. Cl.
G06F 19/00  (2011.01)
(52) U.S. Cl. ........................ 700/245; 700/250
(58) Field of Classification Search .................. 700/245, 700/250; 703/4, 5, 13, 14, 18; 702/61; 318/560
See application file for complete search history.

(56) References Cited

U.S. PATENT DOCUMENTS

| | | | |
|---|---|---|---|
| 4,279,013 | A | 7/1981 | Cameron et al. |
| 6,291,959 | B1 | 9/2001 | Yoshida et al. |
| 7,084,595 | B2 | 8/2006 | Brogardh et al. |
| 2005/0209798 | A1* | 9/2005 | Ranta ................................. 702/60 |
| 2007/0021868 | A1 | 1/2007 | Nagatsuka et al. |
| 2010/0117568 | A1* | 5/2010 | Iwashita et al. ........... 318/400.02 |

FOREIGN PATENT DOCUMENTS

| | | |
|---|---|---|
| EP | 1752847 A2 | 2/2007 |
| EP | 2082851 A1 * | 7/2009 |
| JP | 56-82909 | 7/1981 |
| JP | 11-338527 A | 12/1999 |
| JP | 2000271836 A | 10/2000 |
| JP | 2002055711 A | 2/2002 |
| JP | 2002236508 A | 8/2002 |
| JP | 2004522602 A | 7/2004 |
| JP | 2006022512 A | 1/2006 |
| JP | 3946753 B2 | 7/2007 |
| JP | 2007-310893 A | 11/2007 |

OTHER PUBLICATIONS

Decision of Patent Grant for JP2009-292843 dated Jul. 20, 2010.

* cited by examiner

*Primary Examiner* — Khoi Tran
*Assistant Examiner* — Brian J Broadhead
(74) *Attorney, Agent, or Firm* — Lowe Hauptman Ham & Berner, LLP

(57) ABSTRACT

A power consumption estimation apparatus comprising an execution part for executing an operation program of a robot, a velocity calculation part for each axis drive motor of the robot, a torque calculation part for each axis drive motor, a current value calculation part for calculating a current value of each axis drive motor; a mechanical work calculation part; a motor heat amount calculation part; and an amplifier heat amount calculation part for each axis drive motor, an output electric energy calculation part for the robot controller, a controller heat calculation part for the robot controller, and a power consumption calculation part for the robot system based on the mechanical work of each axis drive motor, the amount of heat of each axis drive motor, the amount of heat of the amplifier, and the amount of heat of the robot controller.

6 Claims, 10 Drawing Sheets

POWER CONSUMPTION ESTIMATION APPARATUS

RELATED APPLICATION

The present application is based on, and claims priority from Japanese Application Number 2009-127943, filed May 27, 2009, the disclosure of which is hereby incorporated by reference herein in its entirety.

BACKGROUND OF THE INVENTION

1. Field of the Invention

The present invention relates to a power consumption estimation apparatus for estimating power consumption of a robot system using a simulation of robot motions in the robot offline programming system.

2. Description of the Related Art

In the robot system, a robot controlled by a controller may repeat a series of motions which relate to handling or spot welding. In recent years, it has been requested to obtain the power consumption of the robot system when the robot system performs repetitive motions.

The reason therefor is, for example, to make an annual plan relating to the robot system precisely based on the power consumption of the robot system. Further, if the power consumption of the robot system can be previously known, it has also been requested to achieve the power consumption reduction by improving the motions of the robot in advance.

Japanese Registered Patent Publication No. 3946753 discloses estimation of the current value of the each axis drive motor in the robot simulation. In Japanese Registered Patent Publication No. 3946753, judgment is carried out as to whether or not the load on the each axis drive motor exceeds the allowable value, or whether or not the motor at each axis is overheated, based on the estimated current value.

In Japanese Registered Patent Publication No. 3946753, although the load and the current value of each axis drive motor can be estimated, the mechanical work and loss of each axis drive motor, loss of an amplifier, and loss of a controller with respect to the robot motion cannot be estimated. As a result, the power consumption of the robot system cannot be known precisely.

Because the power consumption of the robot system cannot be known in advance, improvement of the robot motion in order to reduce power consumption cannot be carried out.

The present invention has been invented in view of the above drawbacks. An object of the present invention is to provide a power consumption estimation apparatus which enables the power consumption of a robot system to be known precisely, without actually performing repetitive motions.

SUMMARY OF THE INVENTION

In order to attain the above object, a first aspect provides a power consumption estimation apparatus for estimating power consumption of a robot system, which includes a robot and a controller device for controlling the robot, by simulation, comprising; an execution part for executing an operation program of the robot, a velocity calculation part for calculating a velocity of each axis drive motor which drives each axis of the robot for each unit time, a torque calculation part for calculating a torque of each axis drive motor for unit time, a memory part for storing the torque and the velocity of each axis drive motor which are calculated by the torque calculation part and the velocity calculation part respectively, and which are chronologically correlated, a current value calculation part for calculating a current value flowing each axis drive motor based on the torque of each axis drive motor, a mechanical work calculation part for calculating a mechanical work of the axis drive motor based on the current value calculated by the current value calculation part and the velocity, a motor heat amount calculation part for calculating an amount of heat of each axis drive motor based on the current value and a winding resistance of each axis drive motor, an amplifier heat amount calculation part for obtaining an amount of heat of an amplifier of each axis drive motor, based on the current value, an output electric energy calculation part for calculating output electric energy of the robot controller based on the mechanical work of each axis drive motor calculated by the mechanical work calculation part, the amount of heat of each axis drive motor calculated by the motor heat amount calculation part, and the amount of heat of the amplifier calculated by the amplifier heat amount calculation part, a controller heat amount calculation part for calculating an amount of heat of the robot controller based on the output electric energy of the robot controller calculated by the output electric energy calculation part, and a resistance of the robot controller, and a power consumption calculation part for calculating the power consumption per unit time of the robot system, by adding the mechanical work of each axis drive motor, the amount of heat of each axis drive motor, the amount of heat of the amplifier, and the amount of heat of the robot controller.

According to a second aspect, the first aspect further comprises an evaluation part for evaluating whether or not the velocity of each axis drive motor or the calculated power consumption exceeds their reference value.

According to a third aspect, the first aspect further comprises a designation part for designating a reduction rate of the power consumption, and a modification part which, when the velocity of each axis drive motor or the calculated power consumption is greater than a reference range, reduces a corresponding velocity command or acceleration command in the operation program by a predetermined amount, and when the velocity of each axis drive motor or the calculated power consumption is smaller than the reference range, increases a corresponding velocity command or acceleration command in the operation program by a predetermined amount.

According to a fourth aspect, the first aspect further comprises a designation part for designating a reduction rate of a cycle time necessary for executing the operation program, and a modification part which, when the velocity of each axis drive motor or the calculated power consumption is larger than a reference range, reduces a corresponding velocity command or acceleration command in the operation program by a predetermined amount, and when the velocity of each axis drive motor or the calculated power consumption is smaller than the reference range, increases a corresponding velocity command or acceleration command in the operation program by a predetermined amount.

According to a fifth aspect, in the third or fourth aspect, the reference range of the velocity of each axis drive motor or the calculated power consumption is designated by the designation part.

These and other objects, features and advantages of the present invention will be more apparent in light of the detailed description of exemplary embodiments thereof as illustrated by the drawings.

DETAILED DESCRIPTION

Figure 1:
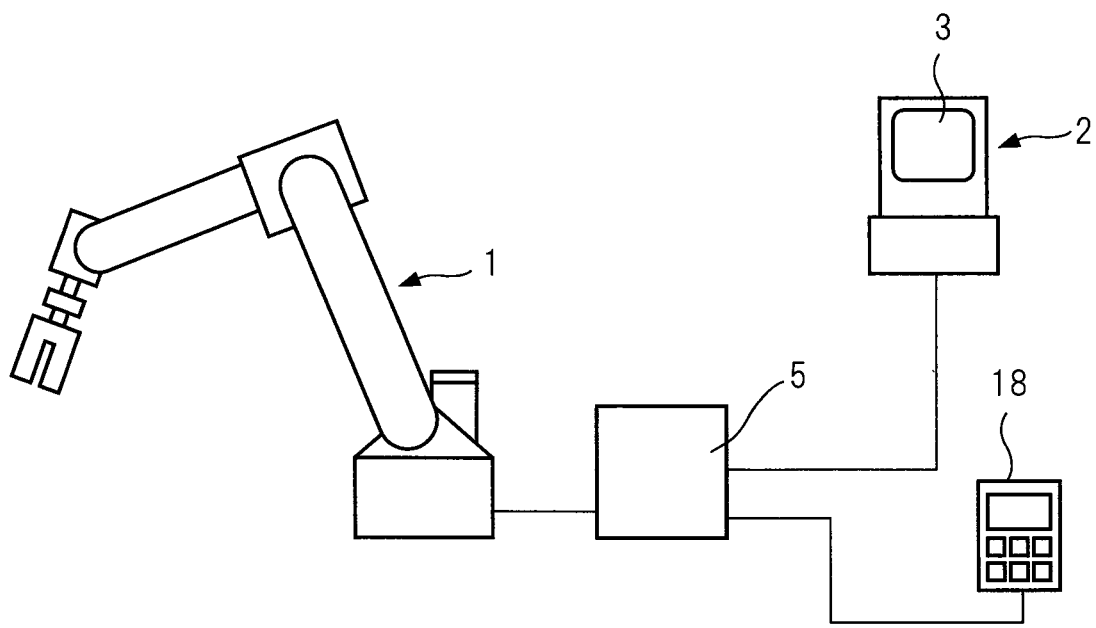
FIG. 1 is a schematic view of a robot system including the power consumption estimation apparatus according to the present invention.

The embodiments of the present invention will be explained with reference to the attached drawings. In the drawings, the similar reference numeral is assigned to the same member. For sake of easy understanding, the scales of the drawings have been appropriately changed.

FIG. 1 is a schematic view of a robot system including the power consumption estimation apparatus according to the present invention. The robot system shown in FIG. 1 mainly includes a robot 1, for example, a hexaxial multijoint robot having a plurality of arms, and a robot controller 5 which controls the robot 1. The robot controller 5 is connected to a teaching operation panel 18. The teaching operation panel 18 is provided with a manual operation key and a display. An operator can operate the robot 1 by operating the teaching operation panel 18. Further, as shown in FIG. 1, the robot controller 5 is connected to a power consumption estimation apparatus 2 which estimates the power consumption of the robot system.

Figure 2:
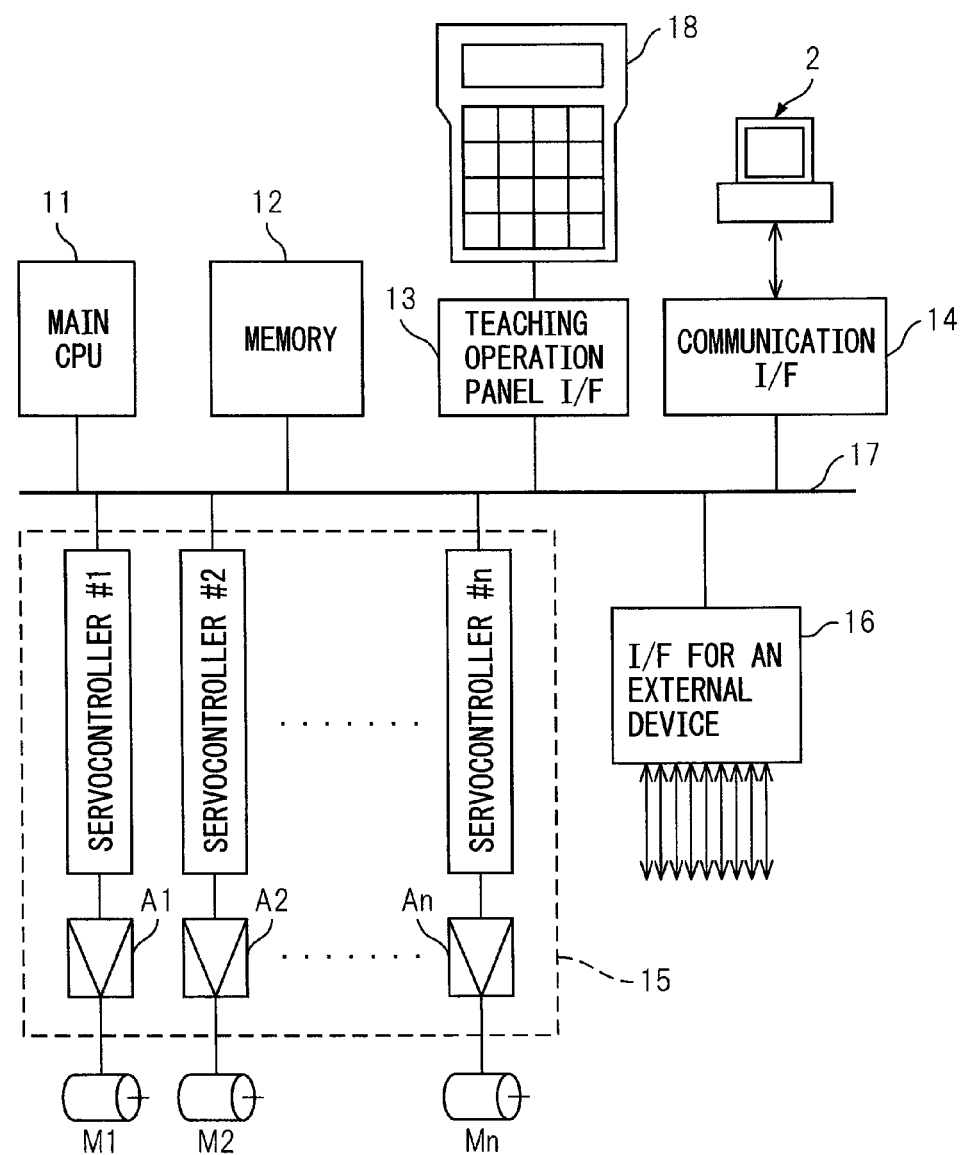
FIG. 2 is a block diagram of a robot controller included in the robot system of FIG. 1.

FIG. 2 is a block diagram of the robot controller included in the robot system of FIG. 1. As shown in FIG. 2, a main CPU 11 is connected to a bus 17, to which a memory 12 such as a RAM, ROM, nonvolatile memory, and the like, a teaching operation panel interface 13, an input-output interface 16 for an external device, a servocontrol part 15, and a communication interface 14 are connected in parallel.

The operator operates the teaching operation panel 18 connected to the teaching operation panel interface 13, so as to perform creation, modification, registration, or various parameter settings of the operation program of the robot 1, as well as the reproductive operation of the operation program which has been taught, jog feed, and the like. The operation program to be executed in the present invention is a program which includes replaying operations relating to the handling or the spot welding of the robot.

Furthermore, the system program which supports the basic function of the robot 1 and the robot controller 5 is stored in the ROM of the memory 12. Further, the operation program of the robot which is taught in accordance with the application and the setting data related thereto are stored in the nonvolatile memory of the memory 12.

The RAM of the memory 12 is used as a storage area for temporally storing the data of various arithmetic processings performed by the main CPU 11. The servocontrol part 15 includes servocontrollers #1 to #n (n is a total axis number of the robot, and herein, n=6). The servocontrol part 15 receives move commands created by the arithmetic processing (creation of a trajectory plan, and interpolation, inverse transformation, etc., based thereon) for controlling the robot 1, and outputs torque commands to servo amplifiers A1 to An together with feedback signals received from pulse coders (not shown) attached to respective axes.

These servo amplifiers A1 to An supply current to the servo motors M1 to Mn of the respective axes (conveniently referred to as respective axis drive motors) based on the respective torque commands to drive the same. The communication interface 14 is connected to the power consumption estimation apparatus 2. However, in this regards, the power consumption estimation apparatus 2 is not necessarily connected to the robot controller 5, and the power consumption estimation apparatus 2 can be operated offline.

Figure 3:
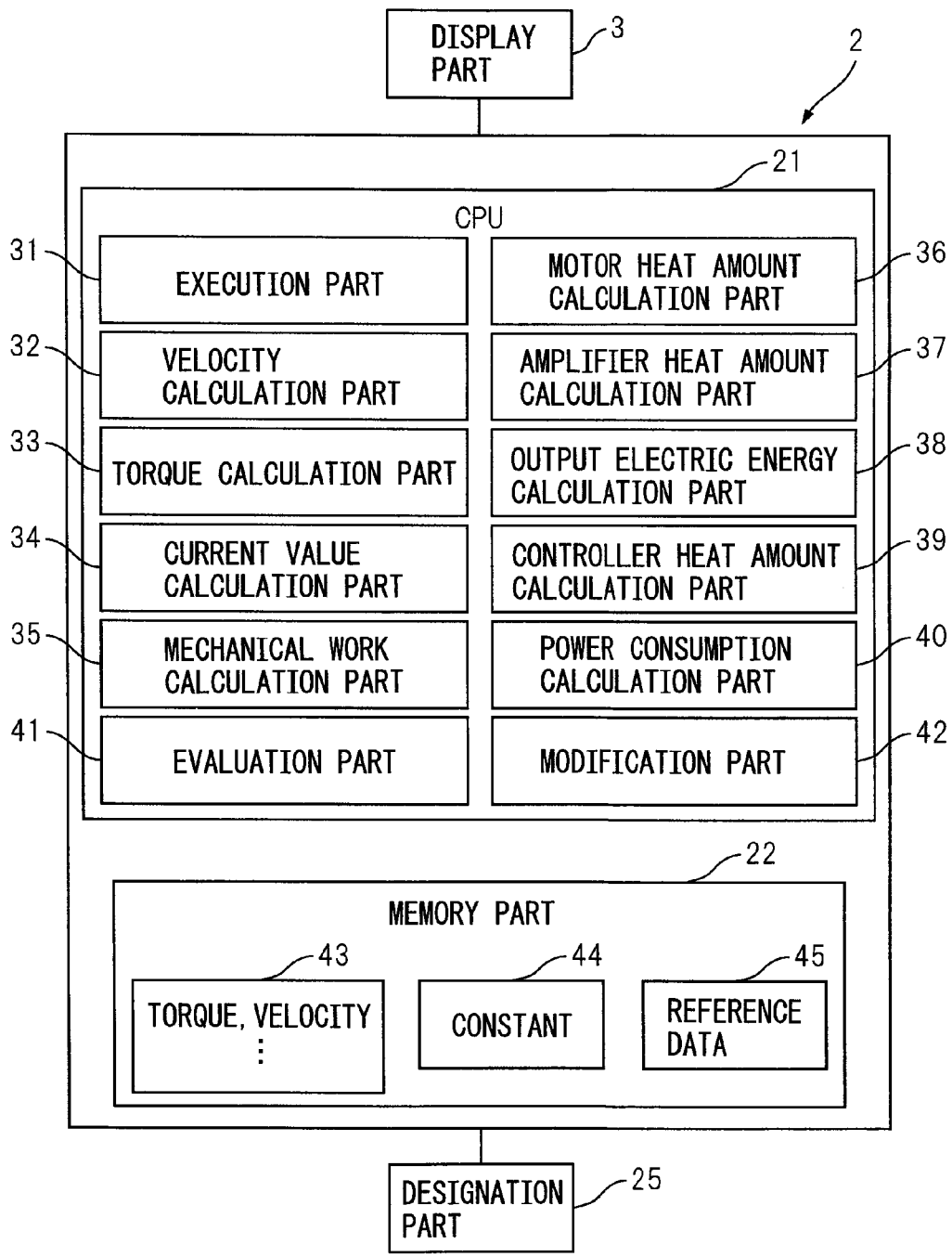
FIG. 3 is a block diagram of the power consumption estimation apparatus shown in FIG. 1.

FIG. 3 shows a block diagram of the power consumption estimation apparatus shown in FIG. 1. The power consumption estimation apparatus 2 is a digital computer which mainly comprises a CPU 21 and a memory part 22. Furthermore, as shown in FIG. 3, the power consumption estimation apparatus 2 is connected to a display part 3, such as a CRT or liquid crystal display, and a designation part 25, such as a mouse or a keyboard.

As shown in FIG. 3, the CPU 21 comprises an execution part 31 which executes the operation program of the robot 1 to perform the simulation, as well as and a velocity calculation part 32 and a torque calculation part 33 which calculate the velocity of each axis drive motor and the torque of each axis, for each unit time, respectively, at the time of the simulation.

Furthermore, the CPU 21 comprises a current value calculation part 34 which calculates the respective current values flowing through the motors M1 to Mn, mechanical work calculation part 35 which calculates the respective mechanical works of the motors M1 to Mn based on the current values and the velocities, a motor heat amount calculation part 36 which calculate the respective amounts of heat of the motors M1 to Mn based on the current values and the winding resistances of the motors M1 to Mn, and an amplifier heat amount calculation part 37 which obtains the respective amounts of heat of the servo amplifiers A1 to An of the motors M1 to Mn from the current values.

Furthermore, the CPU 21 comprises an output electric energy calculation part 38 which calculates output electric energy of the robot controller 5 based on the mechanical works of the motors M1 to Mn calculated by the mechanical work calculation part 35, the amounts of heat of the motors M1 to Mn calculated by the motor heat amount calculation part 36, and the amounts of heat of the amplifiers A1 to An calculated by the amplifier heat amount calculation part 37.

Furthermore, the CPU 21 comprises a controller heat amount calculation part 39 which calculates the amount of heat of the robot controller 5 based on the output electric energy of the robot controller 5 calculated by the output electric energy calculation part 38, and the resistance of the robot controller 5. Furthermore, the CPU 21 comprises a power consumption calculation part 40 which calculates the power consumption per unit time of the robot system by adding the mechanical works of the motors M1 to Mn, the amounts of heat of the motors M1 to Mn, the amounts of heat of the amplifiers A1 to An, and the amount of heat of the robot controller 5.

Furthermore, the CPU 21 comprises an evaluation part 41 which evaluates whether or not the velocities of the motors M1 to Mn or the above calculated power consumption exceeds the reference value thereof, and a modification part 42 which modifies a velocity command or an acceleration command in the corresponding program line of the operation program by a predetermined amount, when the velocities of the motors M1 to Mn or the above calculated power consumption deviate from the reference range.

The memory part 22 stores the torque and velocity 43 calculated by the velocity calculation part 32 and the torque calculation part 33, respectively, and correlated in chronological order. Furthermore, the memory part 22 stores various constants 44 and reference data 45 such as reference values and reference ranges. The memory part 22 may also serve as the memory 12 of the robot controller 5, or may store the data in the memory 12.

Figure 4:
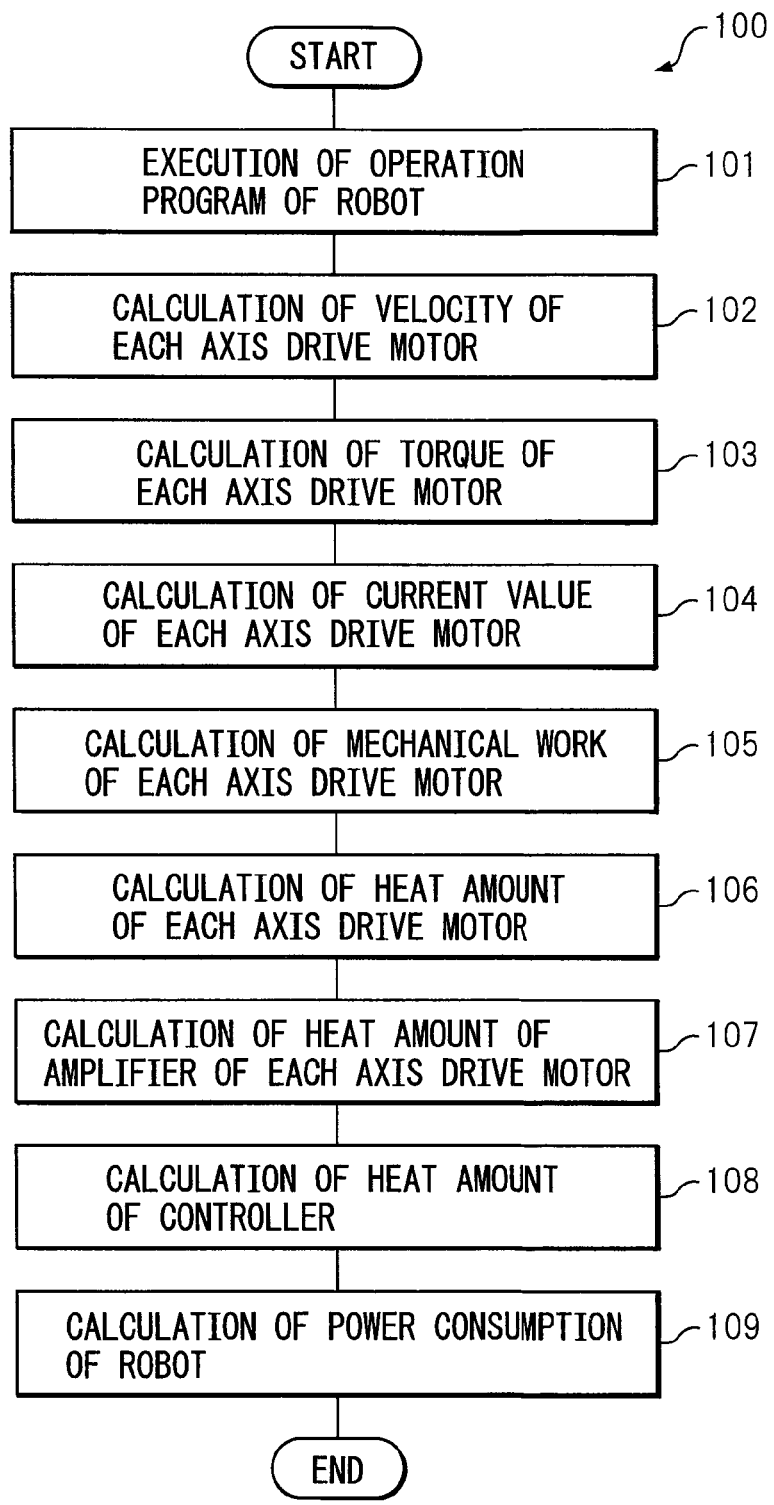
FIG. 4 is a flowchart showing simulated operations of the power consumption estimation apparatus according to the present invention.

FIG. 4 is a flowchart showing a simulation operation 100 of the power consumption estimation apparatus. Hereinbelow, the operation of the power consumption estimation apparatus 2 according to the present invention will be explained with reference to FIG. 4. At first, in Step 101, the power consumption estimation apparatus 2 reads out the operation program of the robot 1 for performing the simulation of the motions of robot 1. This operation program includes a repeat of a series of motions relating to handling or spot welding.

By the simulation of the operation program, the movement distance, movement direction, etc., per unit time, of the arm of robot 1 can be determined. In addition, by performing the simulation, the time required for the robot 1 to carry out the motion according to the operation program (hereinafter referred to as the cycle time) can also be determined.

Then, in Step 102, the velocity calculation part 32 calculates the velocities V of the motors M1 to Mn for each unit time. Specifically, the velocity calculation part 32 divides the movement distance of the arm by the unit time to thereby obtain the respective velocities V of the motors M1 to Mn for each unit time.

Then, in Step 103, the torque calculation part 33 calculates the torque τ applied to the axes of the motors M1 to Mn, for each unit time. The calculation of the torque τ is publicly known, and thus, the calculation of the torque is briefly explained as follows.

First, based on Newton's second law of motion, the resultant force $^0f_i$ of the respective external forces acting on the motors M1 to Mn is obtained. Then, based on Euler equations of motion, the moment $^0n_i$ of the external force is calculated by the following formula.

$$n = I \cdot \omega' + \omega \times (I \cdot \omega)$$

I is a rigid body inertia tensor [g·m$^2$], ω' is an angular acceleration of each axis of the robot 1, and ω is an angular velocity of each axis of the robot 1. In the case of calculating the external force and moment, the DH parameter of the robot 1 is used.

Thereafter, based on the following formulae, the torque τ of each axis is calculated. In this regard, $^0Z_i^T$ represents the direction (vector) toward the hand tip side when the z-axis is directed to the axis direction of the joint i.

$$\tau i = {^0Z_i^T} \times {^0n_i} \text{(rotary joint)}$$

$$\tau i = {^0Z_i^T} \times {^0f_i} \text{(prismatic joint)}$$

Then, the torque τ obtained in Step 103 is multiplied by the torque constant, and thereby, the current value calculation part 34 calculates the current values of the motors M1 to Mn for each unit time (Step 104).

Then, in Step 105, the mechanical work calculation part 35 calculates mechanical works P1[W] of the motors M1 to Mn for each unit time, by the following formula.

$$P1 = IQ \times Kt \times V$$

IQ is a Q phase current [Ap], Kt is a torque constant [Nm/Ap], and V is a motor velocity [rad/sec]. The mechanical work P1 is a sum of the respective mechanical works of the motors M1 to Mn, and this is the same below.

Then, in Step 106, the motor heat amount calculation part 36 calculates the amounts of heat P2[W] of the motors M1 to Mn as a loss, for each unit time, by the following formula.

$$P2 = 3 \times IEFF^2 \times R$$

IEFF is a root-mean-square current [Ap], R is a winding resistance (per phase) [Ω] of the motors M1 to Mn.

Then, in Step 107, the amplifier heat amount calculation part 37 calculates the amounts of heat P3[W] of the amplifiers A1 to An for each unit time.

$$P3 = A + B \times IEFF$$

A is a servo amplifier loss coefficient [W], B is a servo amplifier loss coefficient [W/Ap], and IEFF is a root-mean-square current [Ap]. The servo amplifier loss coefficients A and B are values determined corresponding to each of the amplifiers A1 to An.

Then, in Step 108, the output electric energy calculation part 38 calculates the output electric energy of the robot controller 5, for each unit time, by the following formula.

$$P' = P1 + P2 + P3$$

Then, the controller heat amount calculation part 39 calculates the amount of heat of the robot controller 5 by the following formula.

$$P4 = D \times (|P1 + P2 + P3|)$$

D is a controller loss coefficient [W/W].

Finally, in Step 109, the power consumption calculation part 40 calculates the power consumption PA of the robot 1 for each unit time, by the following formula.

$$PA = P1 + P2 + P3 + P4$$

In this manner, in the present invention, the operation program of the repeated motion is simulated, and thus, power consumption PA of the robot system can be precisely calculated without actually moving the robot 1. Accordingly, the purchaser, etc., of the robot 1 can make an annual plan of the robot system based on the calculated power consumption PA, and can obtain the necessary expense accurately.

Additionally, if the robot 1 is actually moved based on the operation program, when the torque applied on the arm of the robot 1 is too large, there is a possibility that the arm may be damaged due to the load applied thereto. Therefore, even if the calculated power consumption PA is a favorable value, it is preferable to curtail the load applied to the arm in advance.

Figure 5:
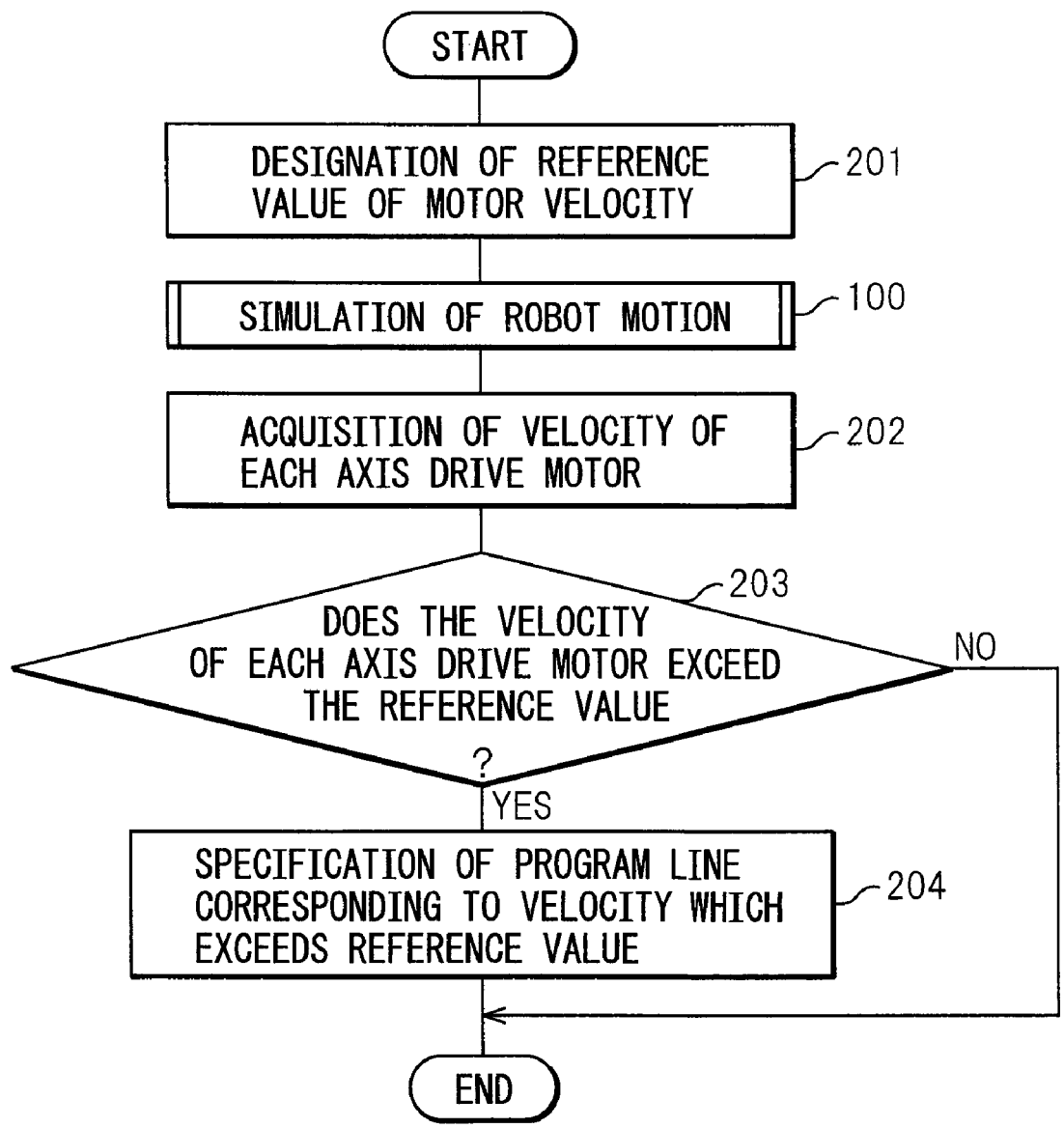
FIG. 5 is a flowchart showing other operations of the power consumption estimation apparatus.

FIG. 5 is a flowchart showing other operations of the power consumption estimation apparatus 2 which are performed in such case. In Step 201 of FIG. 5, an operator designates the velocity reference values VA of the motors M1 to Mn using the designation part 25, for example, a mouse or a keyboard. The velocity reference value VA may be a common value for all of the motors M1 to Mn, or may be individual values for the respective motors M1 to Mn. The velocity reference value VA may be previously stored in the reference data 45 stored in the memory part 22. Further, the velocity reference value VA designated in Step 201 is the upper limit for the velocity V.

Then, the simulation operation 100 explained with reference to FIG. 4 is carried out. Then, the velocities V of the motors M1 to Mn which are calculated in Step 103 of the simulation operation 100 are obtained (Step 202).

Figure 6:
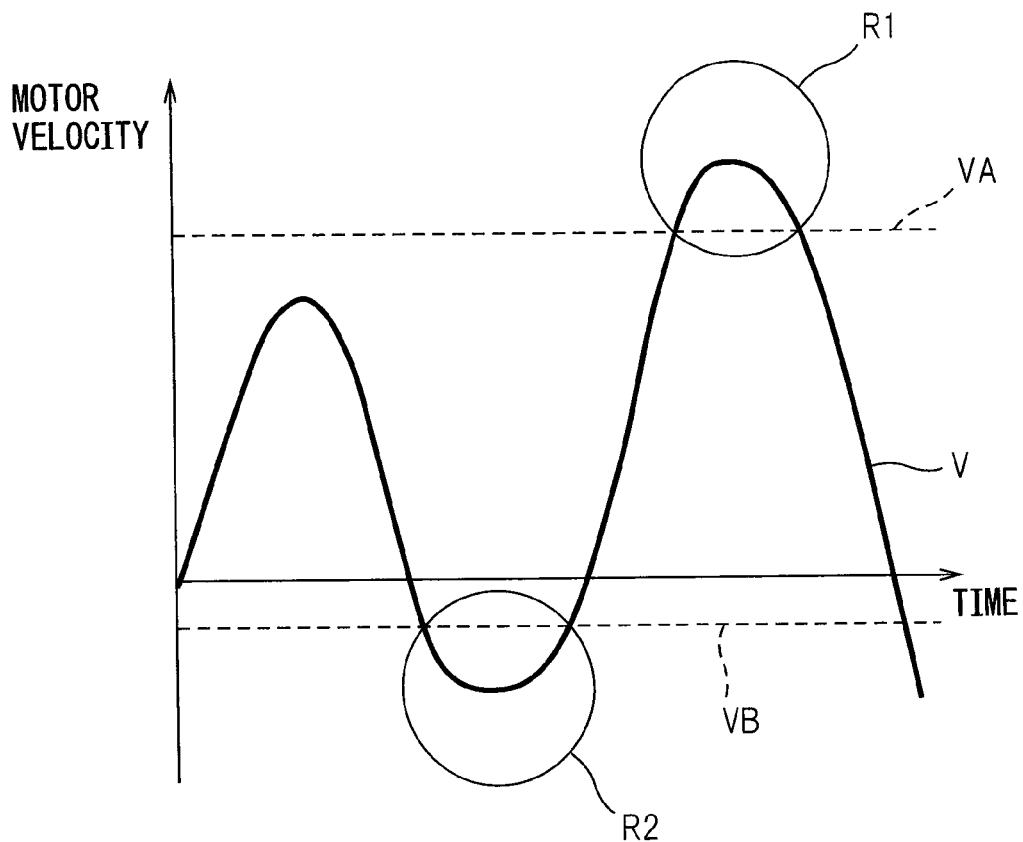
FIG. 6a is a view showing the relationship between the velocity and time of each axis drive motor.
FIG. 6b is a view showing a part of an operation program.

Thereafter, the evaluation part 41 of the power consumption estimation apparatus 2 compares the velocities V of the motors M1 to Mn with the velocity reference value VA (Step 203). FIG. 6a shows the relationship between the velocity of each axis drive motor and time. If the velocity V is larger than the velocity reference value VA, for example, if the velocity V is within the circle R1 in FIG. 6a, the process proceeds to Step 204. If the velocity V is not larger than the velocity reference value VA, it is judged that the load applied onto the arm is small, and the process terminates.

In Step 204, the program line of the operation program corresponding to the velocity V which exceeds the velocity reference value VA is specified. The program line is specified based on the time when the velocity V exceeds the velocity reference value VA. FIG. 6b shows a part of the operation program. In FIG. 6b, a part of the operation program is displayed on the display part 3 of the power consumption estimation apparatus 2, and the specified program line is highlighted. The program line can be specified by other means.

Specifying the program line as just described can alert the operator. If the program line is specified, the operator has only to change the command velocity of the program line using the designation part 25 of the teaching operation panel 18. Thereby, without actually moving the robot 1, application of a large load onto the arm can be avoided in advance. Further, as a matter of course, the program line may be specified by comparing the torque calculated by the torque calculation part 33 with the similar reference value.

Figure 7:
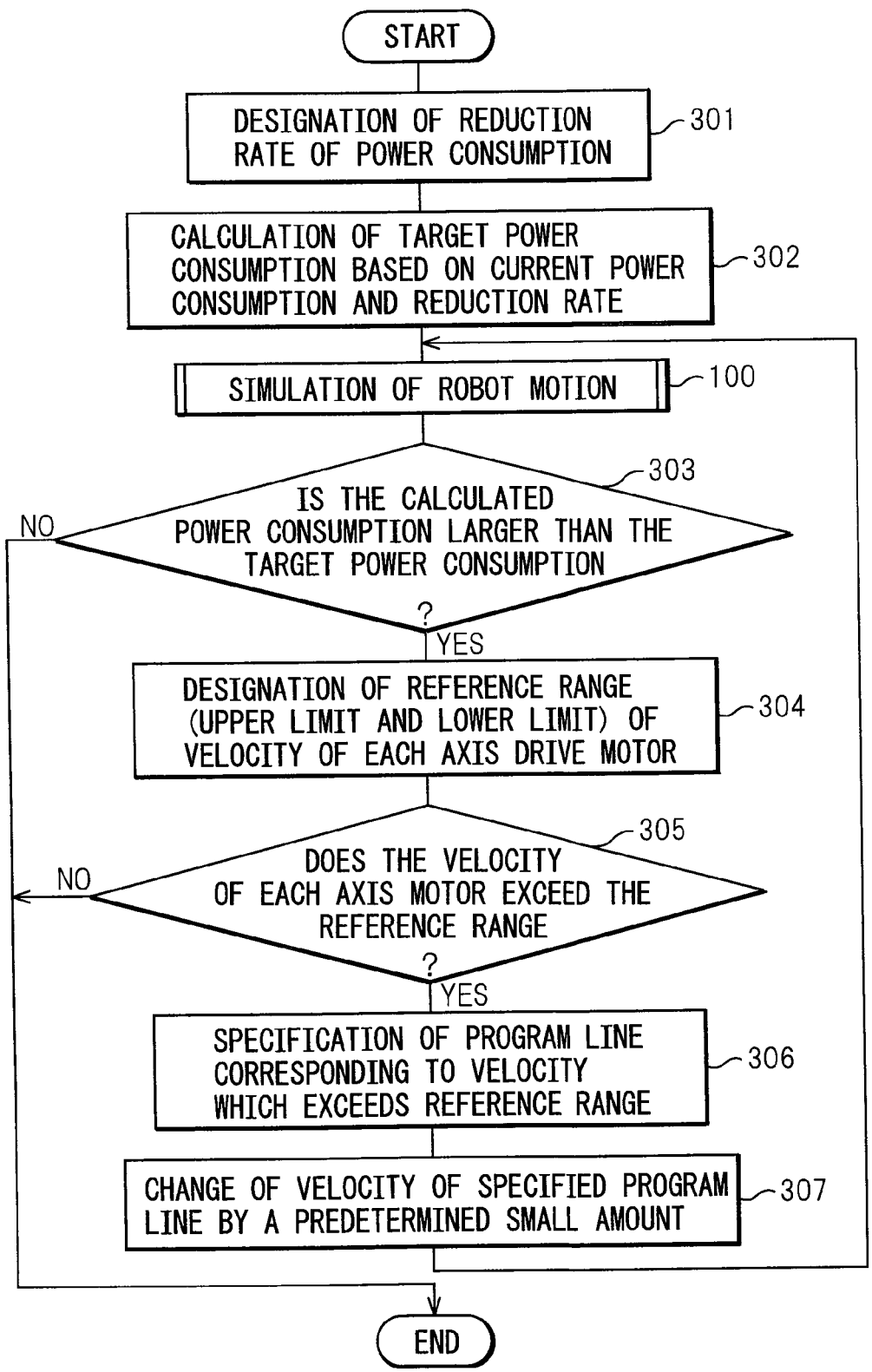
FIG. 7 is a flowchart showing operations in the power consumption estimation apparatus at the time of reducing the power consumption based on the judgment as to whether or not the motor velocity exceeds the reference range.

Additionally, if the current power consumption Pc measured in the actual robot system is larger than a desired value, it is desirable to reduce the power consumption PA. FIG. 7 is a flowchart showing the operations of reducing the power consumption in such a case.

First, in Step 301 of FIG. 7, the operator designates the reduction rate of the power consumption PA by the designation part 25. Then, in Step 302, the current power consumption PA is multiplied by the reduction rate to calculate the target power consumption P0.

Then, the simulation operation 100 explained with reference to FIG. 4 is carried out to calculate a new power consumption PA. Then, in Step 303, the calculated power consumption PA and the target power consumption P0 are compared. If the power consumption PA is larger than the target power consumption P0, the process proceeds to Step 304. If the power consumption PA is not larger than the target power consumption P0, it is judged that the power consumption PA is already small, and the process terminates.

In Step 304, the operator designates a reference range for the velocities of the motors M1 to Mn by the designation part 25. Here, the reference range means the range between the upper limit velocity and the lower limit velocity of the motors M1 to Mn. For example, in FIG. 6a, the region partitioned by the upper limit velocity VA and the lower limit velocity VB is the reference range of the motors M1 to Mn. Alternatively, the reference range may be previously stored in the reference data 45 stored in the memory part 22.

Then, the velocities V of the motors M1 to Mn obtained in Step 103 of the simulation operation 100 are obtained and compared with the reference range (Step 305). In other words, in Step 305, whether or not the velocity V is larger than the upper limit velocity VA, and whether or not the velocity V is smaller than the lower limit velocity VB are judged. If the velocity V is larger than the upper limit velocity VA and/or the velocity V is smaller than the lower limit velocity VB, the process proceeds to Step 306. If the velocity V is not larger than the upper limit velocity VA, and is not smaller than the lower limit velocity VB, the process terminates.

In Step 306, the program line of the operation program corresponding to the velocity V which exceeds the reference range of the velocity is specified. In order to specify the program line, similar to the explanation with reference to FIG. 6b, highlighting the relevant program line is preferable. As mentioned above, if the velocity V exceeds the reference range, a large torque may often be applied to the arm. Accordingly, in the present embodiment, specifying the corresponding program line can alert the operator.

In this connection, in the present embodiment, there are cases that the velocity V is larger than the upper limit velocity VA, and smaller than the lower limit velocity VB (refer to the circle R2 in FIG. 6a). In such cases, the corresponding plural program lines are specified.

Then, in Step 307, the command velocity in the specified program line is automatically changed by a predetermined small amount by the modification part 42. Specifically, if the velocity V is larger than the upper limit velocity VA, the modification part 42 reduces the velocity command of the corresponding program line by a small amount, and if the velocity V is smaller than the lower limit velocity VB, the modification part 42 increases the velocity command of the corresponding program line by a small amount.

Then, the process returns to the simulation operation 100, and the process is repeated. Thereafter, in Step 304, the designation of the reference range may be omitted. In Step 303, if the power consumption PA is still larger than the target power consumption P0, the designation can be made again in Step 304 so that the upper limit velocity VA of the reference range becomes slightly smaller and/or the lower limit velocity VB becomes slightly larger. In other words, in the present invention, if the power consumption PA cannot be reduced as desired, the reference range of the velocities of the motors M1 to Mn can be changed. Then, the process is repeated until the velocities V of the motors M1 to Mn fall into the designated reference range. Thereby, it becomes possible to prevent a large load from being applied to the arm of the robot 1, in advance.

Figure 9:
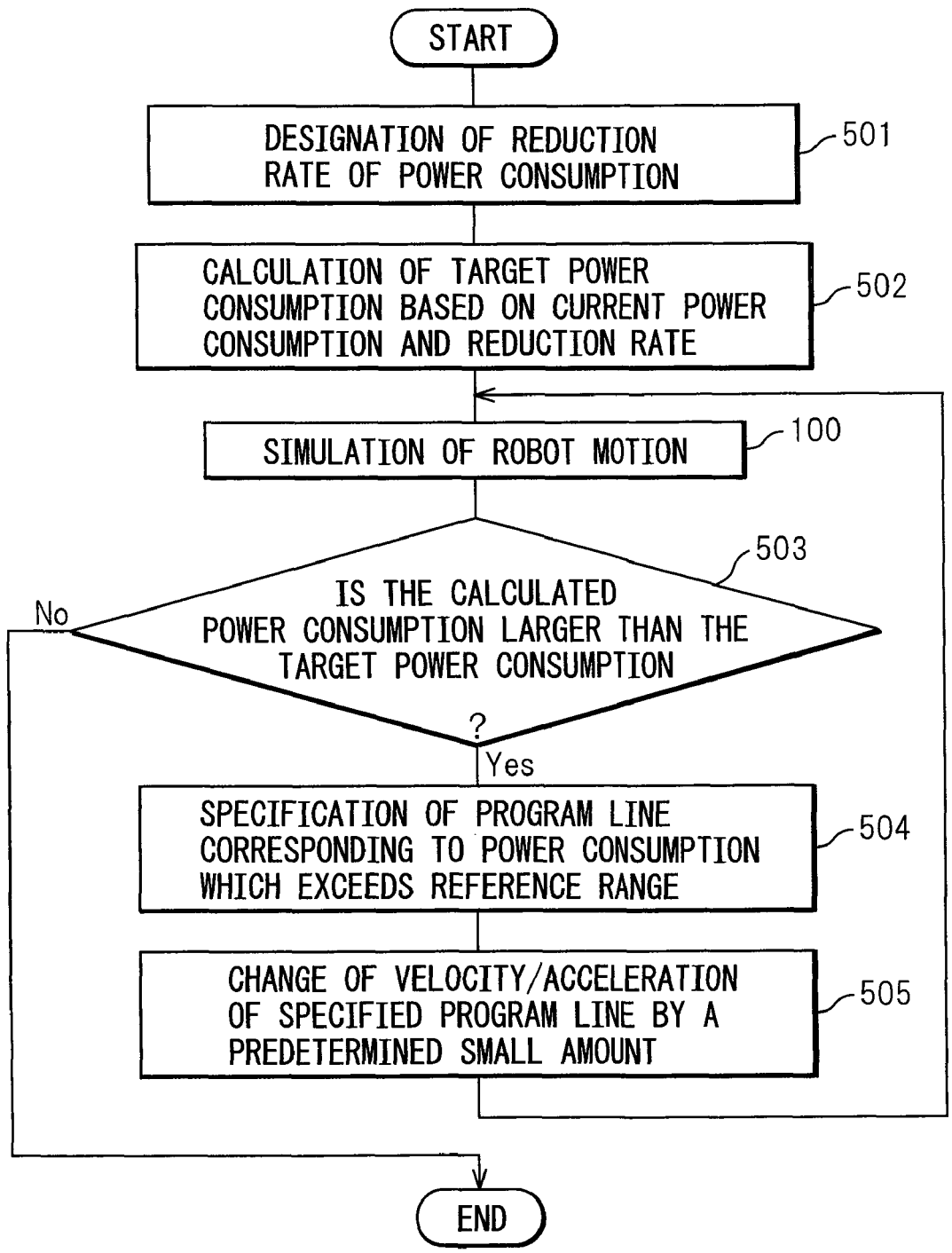
FIG. 9 is a flowchart showing operations in the power consumption estimation apparatus at the time of reducing the power consumption based on the judgment as to whether or not the power consumption exceeds the reference range.

FIG. 9 is a flowchart showing the operation when judging whether or not the above-mentioned calculated power consumption exceeds the reference range and thereby reducing the power consumption.

In Step 501 of FIG. 9, the operator designates a reduction rate of the power consumption PA by the designation part 25. Then, in Step 502, the current power consumption PA is multiplied by the reduction rate to calculate a target power consumption P0.

Then, the simulation operation 100 explained with reference to FIG. 4 is carried out to calculate a new power consumption PA. Then, in Step 503, the calculated power consumption PA and the target power consumption P0 are compared. If the power consumption PA is larger than the target power consumption P0, the process proceeds to Step 504. If the power consumption PA is not larger than the target power consumption P0, it is judged that the power consumption PA is already small, and the process terminates.

In Step 504, the program line of the operation program corresponding to the power consumption PA which exceeds the reference range of the power consumption is specified. In order to specify the program line, similar to the explanation with reference to FIG. 6b, highlighting the corresponding program line is preferable. Further, the reference range (the range between the upper limit and the lower limit) of the power consumption can be previously determined by the operator using the designation part 25, or can be determined after the power consumption is calculated. The same is true for the below-mentioned FIG. 10.

Then, in Step 505, the velocity command or the acceleration command in the specified program line is automatically changed by a predetermined small amount by the modification part 42. Specifically, if the power consumption PA is larger than the power consumption reference range, the modification part 42 reduces the velocity command or the acceleration command in the corresponding program line by a small amount, and if power consumption PA is smaller than the power consumption reference range, the modification part 42 increases the velocity command or the acceleration command in the corresponding program line by a small amount.

Then, the process returns to the simulation operation 100, and the process is repeated. Then, in Step 503, if the power consumption PA is still larger than the target power consumption P0, the designation can be made again in Step 504 so that the power consumption upper limit of the reference range becomes slightly smaller and/or the power consumption lower limit becomes slightly larger. In other words, in the present invention, if the power consumption PA cannot be reduced as desired, the reference range of the power consumption can be changed. Then, the process is repeated until the power consumption falls into the designated reference range.

Figure 8:
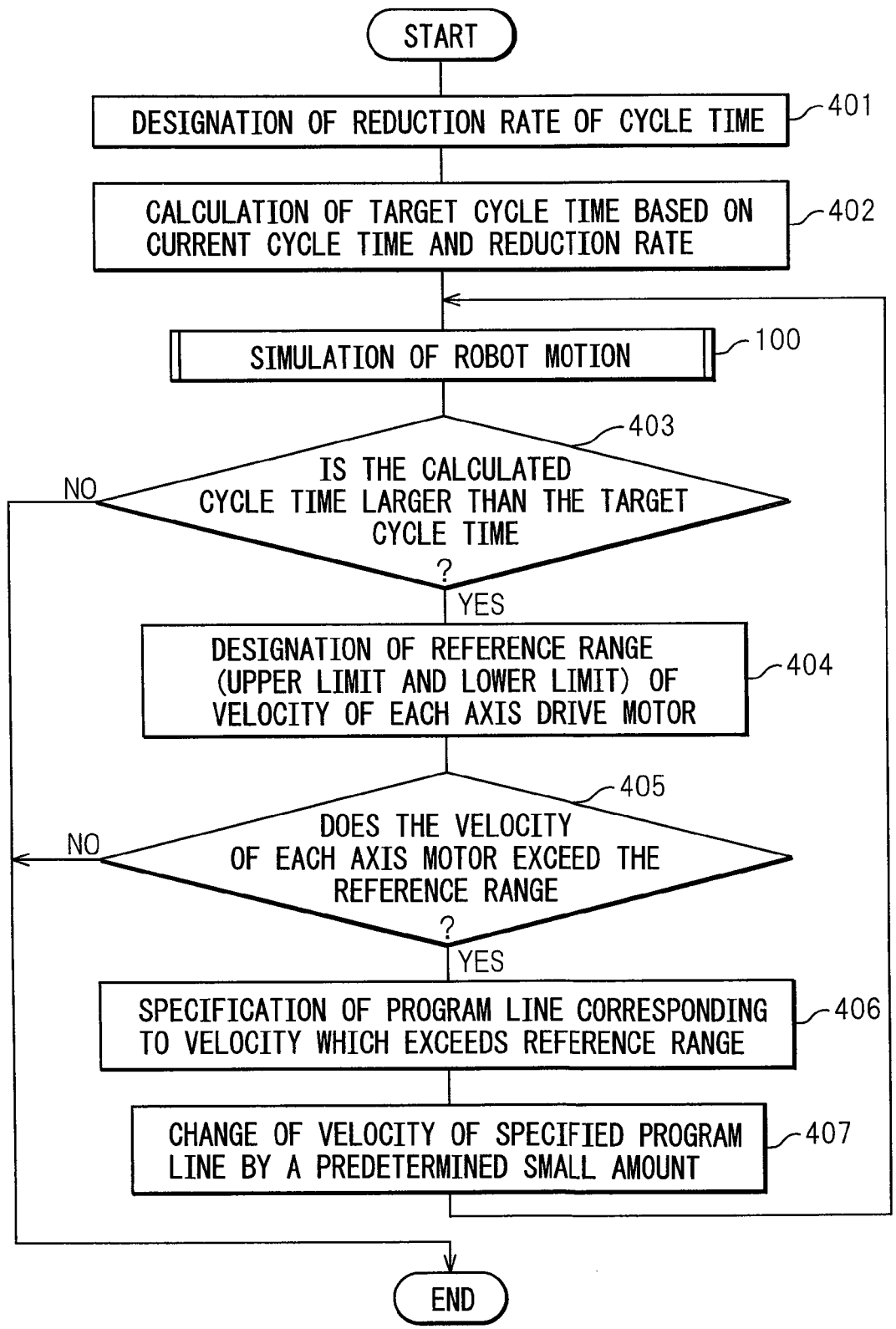
FIG. 8 is a flowchart showing operations in the power consumption estimation apparatus at the time of reducing the cycle time based on the judgment as to whether or not the motor velocity exceeds the reference range.

Additionally, if the actual cycle time of the robot system longer than a desired value, it is desirable to reduce the cycle time. FIG. 8 is a flowchart showing the operations of reducing the cycle time in such a case.

In Step 401 of FIG. 8, the operator designates a reduction rate of the cycle time by the designation part 25. Then, in Step 402, the actually measured current cycle time is multiplied by the reduction rate to calculate a target cycle time.

Then, the simulation operation 100 explained with reference to FIG. 4 is carried out, to thereby calculate the cycle time. In Step 403, the calculated cycle time and the target cycle time are compared. If the cycle time is larger than the target cycle time, the process proceeds to Step 404. If the cycle time is not larger than the target cycle time, it can be judged that the cycle time is sufficiently small, and the process is terminated.

Steps 404 to Step 407 in FIG. 8 are almost the same as the above-mentioned Steps 304 to 307, and thus, the explanation therefor is omitted. In the embodiment shown in FIG. 8, if the cycle time cannot be made as small as desired, the reference range of the velocities of the motors M1 to Mn can be changed. By automatically changing the program line, application of a large load onto the arm of the robot can be avoided in advance.

Figure 10:
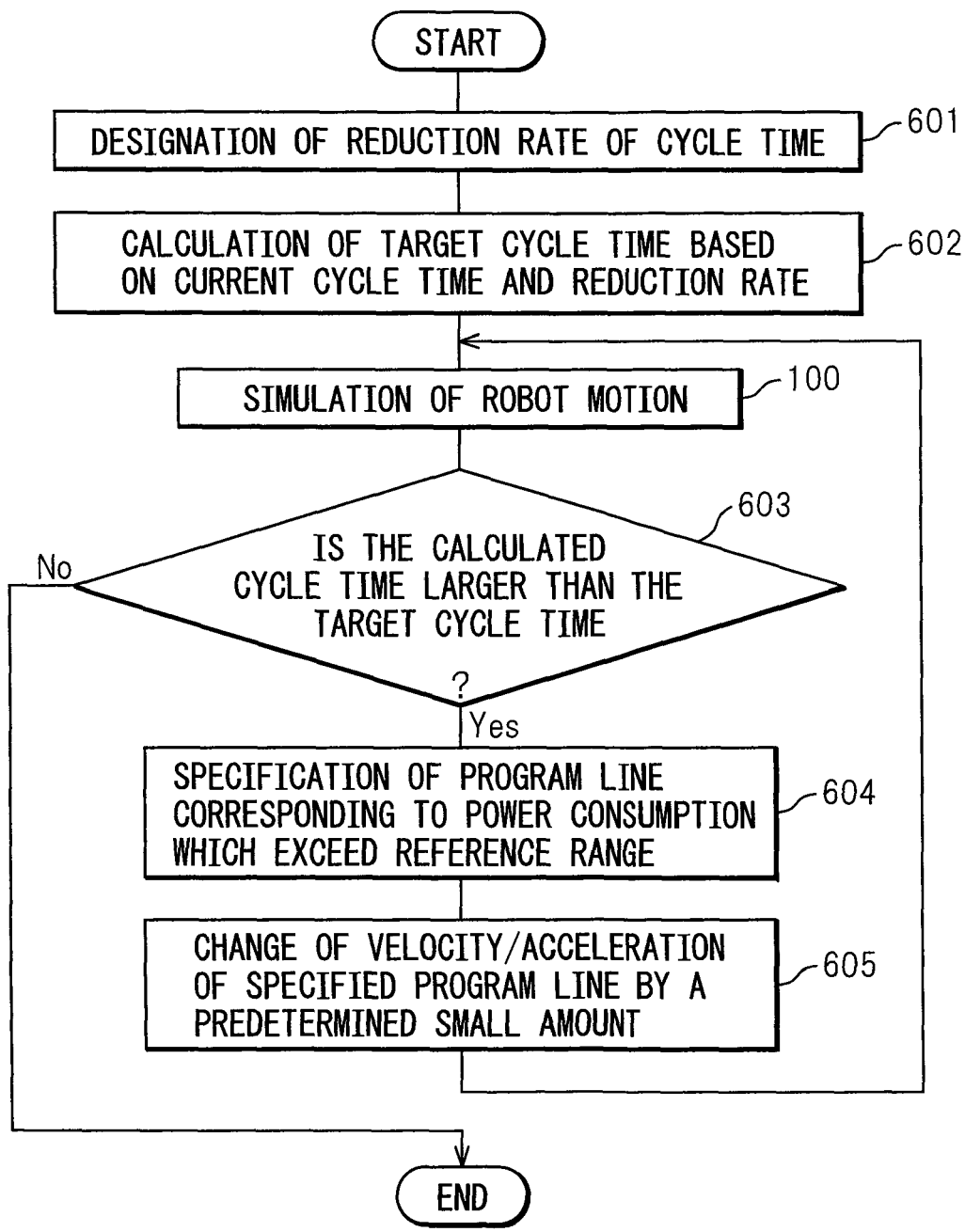
FIG. 10 is a flowchart showing operations in the power consumption estimation apparatus at the time of reducing the cycle time based on the judgment as to whether or not the power consumption exceeds the reference range.

Further, FIG. 10 is a flowchart showing the operation of judging whether or not the calculated power consumption exceeds the reference range, and reducing the cycle time from the view point of the power consumption.

In Step 601 of FIG. 10, the operator designates the reduction rate of the cycle time by the designation part 25. Then, in Step 602, the actually measured current cycle time is multiplied by the reduction rate to calculate a target cycle time.

Then, the simulation operation 100 explained with reference to FIG. 4 is carried out to thereby calculate a cycle time. Then, in Step 603, the calculated cycle time and the target cycle time are compared. If the cycle time is larger than the target cycle time, the process proceeds to Step 604. If the cycle time is not larger than the target cycle time, it can be judged that the cycle time is sufficiently small, and thus, the process terminates.

Steps 604 and 605 of FIG. 10 are almost the same as the above-mentioned Steps 504 and Step 505, and thus, the explanation therefor is omitted. In the embodiment of FIG. 10, if the cycle time cannot be made as small as desired, the reference range of the power consumption can be changed.

EFFECT OF THE INVENTION

Namely, according to the first aspect, power consumption of the robot system can be precisely known without actually moving the robot which performs a work including repetitive motions. Therefore, the annual plan of the robot system can be made based on the precise power consumption, and the necessary expense can be precisely obtained.

According to the second aspect, if the velocity of each axis drive motor exceeds the reference value, the operator can be alerted. Highlighting the corresponding program line to alert the operator is preferable.

According to the third aspect, the velocity command of the operation program can be automatically changed to prevent a large load from being applied to the arm of the robot.

According to the fourth aspect, the velocity command of the operation program can be automatically changed to prevent a large load from being applied to the arm of the robot.

According to the fifth aspect, if the power consumption or the cycle time cannot be made as small as desired, the reference range of the velocity of each axis drive motor can be changed.

Although the invention has been shown and described with exemplary embodiments thereof, it should be understood by those skilled in the art that the foregoing and various other changes, omissions and additions may be made therein and thereto without departing from the spirit and the scope of the invention.

The invention claimed is:

1. A power consumption estimation apparatus for estimating power consumption of a robot system, which includes a robot and a robot controller for controlling the robot, by simulation, comprising;
   an execution part for executing an operation program of the robot,
   a velocity calculation part for calculating a velocity of each axis drive motor which drives each axis of the robot for each unit time,
   a torque calculation part for calculating a torque of each axis drive motor for unit time,
   a memory part for storing the torque and the velocity of each axis drive motor which are calculated by the torque calculation part and the velocity calculation part respectively, and which are chronologically correlated,
   a current value calculation part for calculating a current value flowing each axis drive motor based on the torque of each axis drive motor,
   a mechanical work calculation part for calculating a mechanical work of each axis drive motor based on the current value calculated by the current value calculation part and the velocity,
   a motor heat amount calculation part for calculating an amount of heat of each axis drive motor based on the current value and a winding resistance of each axis drive motor,
   an amplifier heat calculation part for obtaining an amount of heat of an amplifier of each axis drive motor, based on the current value, an output electric energy calculation part for calculating output electric energy of the robot controller based on the mechanical work of each axis drive motor calculated by the mechanical work calculation part, the amount of heat of each axis drive motor calculated by the motor heat amount calculation part, and the amount of heat of the amplifier calculated by the amplifier heat amount calculation part, a controller heat amount calculation part for calculating an amount of heat of the robot controller based on the output electric energy of the robot controller calculated by the output electric energy calculation part, and a resistance of the robot controller, and a power consumption calculation part for calculating the power consumption per unit time of the robot system, by adding the mechanical work of each axis drive motor, the amount of heat of each axis drive motor, the amount of heat of the amplifier, and the amount of heat of the robot controller.

2. A power consumption estimation apparatus according to claim 1 further comprising an evaluation part for evaluating whether or not the velocity of each axis drive motor or the calculated power consumption exceeds their reference value.

3. A power consumption estimation apparatus according to claim 1 further comprising, a designation part for designating a reduction rate of the power consumption, and a modification part which, when the velocity of each axis drive motor or the calculated power consumption is larger than a reference range, reduces a corresponding velocity command or acceleration command in the operation program by a predetermined amount, and when the velocity of each axis drive motor or the calculated power consumption is smaller than the reference range, increases a corresponding velocity command or acceleration command in the operation program by a predetermined amount.

4. A power consumption estimation apparatus according to claim 1 further comprising, a designation part for designating a reduction rate of a cycle time necessary for executing the operation program, and a modification part which, when the velocity of each axis drive motor or the calculated power consumption is larger than a reference range, reduces a corresponding velocity command or acceleration command in the operation program by a predetermined amount, and when the velocity of the axis drive motor or the calculated power consumption is smaller than the reference range, increases a corresponding velocity command or acceleration command in the operation program by a predetermined amount.

5. A power consumption estimation apparatus according to claim 3, wherein the reference range of the velocity of each axis drive motor or the calculated power consumption is designated by the designation part.

6. A power consumption estimation apparatus according to claim 4, wherein the reference range of the velocity of each axis drive motor or the calculated power consumption is designated by the designation part.

* * * * *